United States Patent
Eiletz et al.

(10) Patent No.: US 12,065,028 B2
(45) Date of Patent: Aug. 20, 2024

(54) BATTERY CELL MODULE AND MOTOR VEHICLE

(71) Applicant: Bayerische Motoren Werke Aktiengesellschaft, Munich (DE)

(72) Inventors: Richard Eiletz, Deisenhofen (DE); Christoph Warkotsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 482 days.

(21) Appl. No.: 17/432,166

(22) PCT Filed: Apr. 15, 2020

(86) PCT No.: PCT/EP2020/060507
§ 371 (c)(1),
(2) Date: Aug. 19, 2021

(87) PCT Pub. No.: WO2020/216652
PCT Pub. Date: Oct. 29, 2020

(65) Prior Publication Data
US 2022/0185087 A1  Jun. 16, 2022

(30) Foreign Application Priority Data
Apr. 24, 2019 (DE) .................. 10 2019 110 536.6

(51) Int. Cl.
*B60K 1/04* (2019.01)
*H01M 50/209* (2021.01)
*H01M 50/24* (2021.01)

(52) U.S. Cl.
CPC ............ *B60K 1/04* (2013.01); *H01M 50/209* (2021.01); *H01M 50/24* (2021.01); *B60K 2001/0438* (2013.01); *H01M 2220/20* (2013.01)

(58) Field of Classification Search
CPC ............ B60K 1/04; B60K 2001/0438; H01M 50/209; H01M 50/24; H01M 2220/20; Y02E 60/10; B60Y 2306/01; Y02P 70/50
See application file for complete search history.

(56) References Cited

U.S. PATENT DOCUMENTS 10,442,473 B2 * 10/2019 Erlacher ............. H01M 50/262
2018/0229593 A1 * 8/2018 Hitz ........................ B60L 50/64
2018/0236863 A1    8/2018 Kawabe et al.

FOREIGN PATENT DOCUMENTS

DE       102009007422 A1 * 8/2010 ............... B60K 1/04
DE   10 2009 035 492 A1    2/2011
(Continued)

OTHER PUBLICATIONS

International Search Report (PCT/ISA/210) issued in PCT Application No. PCT/EP2020/060507 dated Jul. 21, 2020 with English translation (four (4) pages).
(Continued)

*Primary Examiner* — James A Shriver, II
*Assistant Examiner* — Michael T. Walsh
(74) *Attorney, Agent, or Firm* — Crowell & Moring LLP

(57) ABSTRACT

A battery cell module for an electrically drivable motor vehicle has a bottom side and a top side. The battery cell module includes a support structure for battery cells and battery cells supported by the support structure. The battery cell module has at least one pressure element, which can be loaded on the bottom side and relocated relative to the support structure in order to transfer a load, in the case of limited load input into the support structure, from the bottom side to the top side. An electrically drivable motor vehicle has a bottom-side structure and a top-side structure. The bottom-side structure and the top-side structure delimit a receiving chamber for battery cell modules. The motor vehicle has at least one such battery cell module. The (Continued)

pressure element is supportable on the bottom-side structure and on the top-side structure in order to transfer a load, in the case of limited load input into the support structure, from the bottom side to the top side.

14 Claims, 3 Drawing Sheets

(56) References Cited

FOREIGN PATENT DOCUMENTS

| DE | 102014213615 | A1 | * | 1/2016 | ............... B60K 1/04 |
|----|--------------|----|---|--------|-----------|
| DE | 102015217630 | A1 | * | 3/2017 | |
| DE | 102022204347 | A1 | * | 11/2023 | ............ B60L 3/0007 |
| DE | 102022124278 | A1 | * | 3/2024 | .......... H01M 10/482 |
| EP | 3 428 993 | A1 | | 1/2019 | |
| EP | 3428993 | A1 | * | 1/2019 | ............... B60K 1/04 |
| JP | 2006-40644 | A | | 2/2006 | |

OTHER PUBLICATIONS

German-language Written Opinion (PCT/ISA/237) issued in PCT Application No. PCT/EP2020/060507 dated Jul. 21, 2020 (five (5) pages).

German-language Search Report issued in German Application No. 10 2019 110 536.6 dated Mar. 5, 2020 with partial English translation (11 pages).

* cited by examiner

BATTERY CELL MODULE AND MOTOR VEHICLE

BACKGROUND AND SUMMARY OF THE INVENTION

The invention relates to a battery cell module, in particular for an electrically drivable motor vehicle, having a lower side and an upper side, the battery cell module having a support structure for battery cells and battery cells supported by the support structure. The invention moreover relates to an electrically drivable motor vehicle, having a lower-side structure and an upper-side structure, wherein the lower-side structure and the upper-side structure delimit a receptacle space for battery cell modules.

In the case of battery-powered electrically driven vehicles with high-voltage accumulator concepts, the battery cell modules are installed in an underfloor region. Battery cell modules for battery-powered electrical vehicles in terms of construction have a structural frame, optionally also a structural module housing, in which the battery cells, optionally including cooling, are fastened. The modules in turn are fastened to a surrounding structure, for example to a high-voltage accumulator housing in the case of conventional designs, or to a body/floor pan center in the case of body-integrated concepts, by way of the frame. For this location of installation, a test EHB085, also referred to as a bollard test, has to be met. In this test, the weakest point in terms of the structure in the underfloor/high-voltage accumulator region is impinged by a vehicle-specific energy by means of a circular specimen having a diameter of 180 mm.

The battery cell modules must not be exposed to any influence of force during the bollard test. That is to say that an intrusion of the specimen has to be stopped before the latter contacts the modules. In current practice, this leads to two measures:

A floor pan plate, for example of aluminum and/or steel, disposed on a ride height line on a lower side of the high-voltage accumulator is embodied in a correspondingly thick manner, this resulting in a high weight of the plate.

Large spacings are provided between the lower side of the high-voltage accumulator, or the floor pan plate, respectively, and the battery cell modules situated thereabove, the spacings usually being between 12 and 16 mm. This here is very valuable installation space which, for example, by way of higher battery cells could translate at a ratio of 1:1 to electrical range.

The invention is based on the object of improving a battery cell module mentioned at the outset in terms of structure and/or function. The invention is moreover based on the object of improving a motor vehicle mentioned at the outset in terms of structure and/or function.

The object is achieved by a battery cell module and by a motor vehicle having such a battery cell module, in accordance with the independent claims. Advantageous embodiments and/or refinements are the subject matter of the dependent claims.

The battery cell module can serve for storing and/or providing electric power. The battery cell module can serve in a mobile application. The battery cell module can serve as a traction battery module. The battery cell module can serve as a high-voltage accumulator. The battery cell module can have a cooling installation. The battery cell module can have an electronic monitoring installation.

The battery cell module can have lateral sides. Unless otherwise stated or not otherwise derived from the context, the indications "bottom", "lower side", "top", "upper side", "lateral side" and "height", or "height direction", respectively, refer to an installed position of the battery module in a motor vehicle. In this instance, "lower side" corresponds to a horizontal, geodetically lower side and/or a side facing the road surface. In this instance, "upper side" corresponds to a horizontal, geodetically upper side and/or a side facing away from the road surface. In this instance, "lateral side" corresponds to a vertical side and/or a side extending between the lower side and the upper side. In this instance, "height", or "height direction", respectively, corresponds to a vertical direction and/or to a direction perpendicular to a road surface.

The support structure can serve for supporting the battery cells, for fastening the latter to a superordinate structure, in particular on a motor vehicle, for enclosing and/or protecting the battery cells on the superordinate structure. The support structure can have at least one external portion. The at least one external portion can be disposed externally on the battery cells. The at least one external portion can form an external wall of the battery cell module. The support structure can have at least one internal portion. The at least one internal portion can be disposed between battery cells or groups of battery cells. The at least one internal portion can form an internal wall of the battery cell module. The support structure can be embodied in the form of a frame. The support structure can have at least one base portion, at least one wall portion, and/or at least one cover portion. The support structure can have at least one fastening portion. The support structure can be produced from a metal sheet. The support structure can be produced by a stamping-and-bending method.

The at least one compression element in a non-loaded initial position can extend downward beyond the lower side. The lower-side load can be a load which is directed from the bottom to the top and/or which is directed from below in the direction of the lower side of the battery module. The load can be applied by a specimen in a test method, or by an obstacle, for example a road bump, during regular operation.

The at least one compression element can be vertically repositionable. The at least one compression element can be displaceable. The at least one compression element can serve for transmitting a compressive force. The at least one compression element can serve for transmitting a compressive force in the vertical direction. The at least one compression element can extend from the lower side to the upper side. The at least one compression element can extend through the battery cell module. The at least one compression element can extend through the battery cell module in the vertical direction.

The limited input of load can be delimited to a predefined specification. The limited input of load can be delimited in such a manner that any impermissible damage to the battery cell module is prevented.

The at least one compression element can be held in a force-fitting and/or form-fitting manner on the support structure, so as to prevent repositioning in the direction of the lower side. The at least one compression element can be held on an internal portion of the support structure. The at least one compression element can be held between two internal portions of the support structure.

The at least one compression element can be held and/or guided in a force-fitting and/or form-fitting manner on the support structure so as to permit repositioning in the direction of the upper side without buckling. The at least one compression element can be held and/or guided on an internal portion of the support structure. The at least one compression element can be held and/or guided between two internal portions of the support structure.

The at least one compression element in a loaded operating position, at a limited input of load into the support structure, can be upwardly repositionable beyond the upper side. The at least one compression element in a loaded terminal position, at a limited input of load into the support structure, can be able to be supported above the upper side. The at least one compression element in a loaded terminal position, at a limited input of load into the support structure, can be plastically deformable while absorbing energy.

The at least one compression element can be disposed on the at least one internal portion of the support structure. The at least one compression element can be embodied in the form of a plate. The at least one compression element can be disposed so as to bear in a planar manner on the at least one internal portion of the support structure. The at least one compression element can be disposed between two internal portions of the support structure.

The at least one compression element can have at least one lower-side load bearing portion. The at least one load-bearing portion can be formed with the aid of a lower edge of the at least one compression element. The at least one compression element can have at least one upper-side support portion. The at least one support portion can be formed with the aid of an upper edge of the at least one compression element.

The at least one compression element can have at least one retaining portion, which for preventing repositioning in the direction of the lower side corresponds in a form-fitting manner with the support structure. The at least one compression element on the at least one retaining portion can be undercut in relation to the support structure.

The motor vehicle can have an electric traction machine. The battery cell module can serve for supplying electric power to the electric traction machine. The lower-side structure can extend horizontally. The lower-side structure can have a floor pan plate. The floor pan plate can be produced from an aluminum alloy and/or from a steel alloy. The upper-side structure can extend horizontally. The upper-side structure can be embodied in the manner of a cover and/or be part of a body. The lower-side structure and the upper-side structure can be disposed so as to be mutually parallel and are mutually spaced apart.

The at least one compression element in the non-loaded initial position can be disposed so as to bear on the lower-side structure or so as to be spaced apart from the lower-side structure. The at least one compression element in the non-loaded initial position can be disposed so as to bear on the upper-side structure or so as to be spaced apart from the upper-side structure. The at least one compression element in the loaded operating position can be disposed so as to bear on the lower-side structure and so as to bear on the upper-side structure or so as to be spaced apart from the upper-side structure. The at least one compression element in the loaded terminal position can be disposed so as to bear on the lower-side structure and so as to bear on the upper-side structure. The at least one compression element in the loaded terminal position, at a limited input of load into the support structure, can be plastically deformed while absorbing energy.

Summarizing, and in other words, the invention results inter alia in a load being supported in the vertical direction (bollard test) in a manner integral to the battery module.

A module frame can be designed such that a type of movable strut, or optionally a plurality of such struts, is/are disposed in the interior of the module, the strut/struts within the module being able to move relative to the module frame in the direction of a vertical axis, thus the direction of force of an intruding specimen of a bollard test, and in this movement not introducing any damaging loads into the module. The strut can project beyond the module at least on the module lower side. A floor pan plate of a high-voltage accumulator can be deformed and initially contact the strut when the bollard specimen intrudes, the strut as a result thereof being able to be displaced upward in the vertical direction relative to the module until the strut bears on a structure lying thereabove, for example a high-voltage accumulator housing or a body, and is supported thereon in the manner of a compression rod.

Loads emanating from the bollard test can be supported, and spacings ("air") between the floor pan plate and the battery cell modules, and optionally also a thickness of the floor pan plate, can be reduced, by way of the invention. Costs and/or weight can be saved. The height obtained by reducing the bollard protection measures can be utilized for reducing the vehicle height, or else be translated to cell height and thus to cell volume, or an electrical range, respectively, while maintaining the overall height of the high-voltage accumulator. The concept is independent of the cell format (prismatic, round, pouch).

Exemplary embodiments of the invention will be described in more detail hereunder with reference to the figures in a schematic and exemplary manner.

DETAILED DESCRIPTION OF THE DRAWINGS

Figure 1:
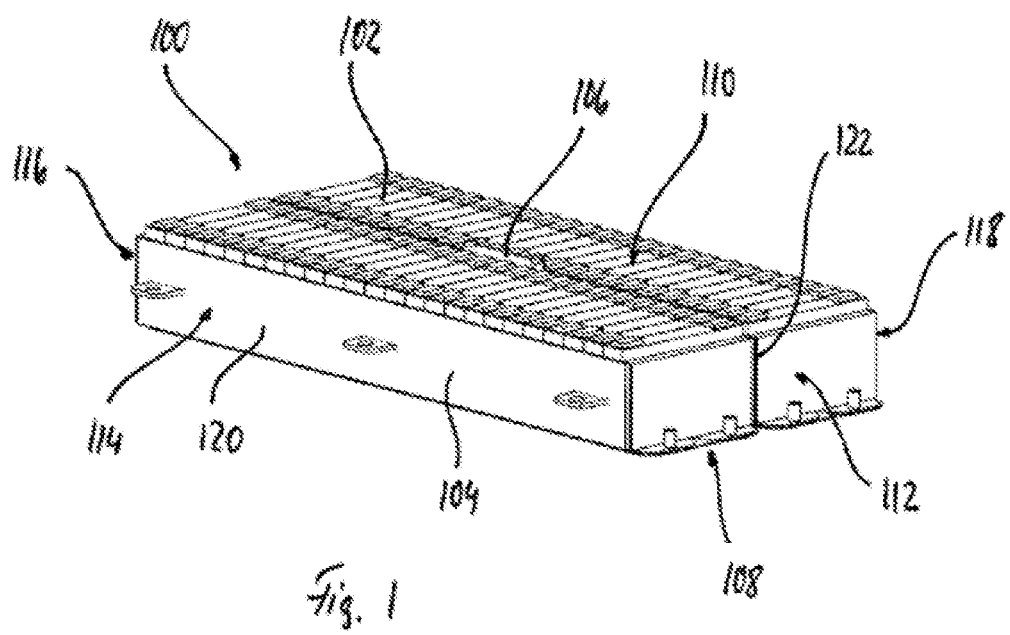
FIG. 1 shows a battery cell module having battery cells, a support structure, and a compression element.
Figure 2:
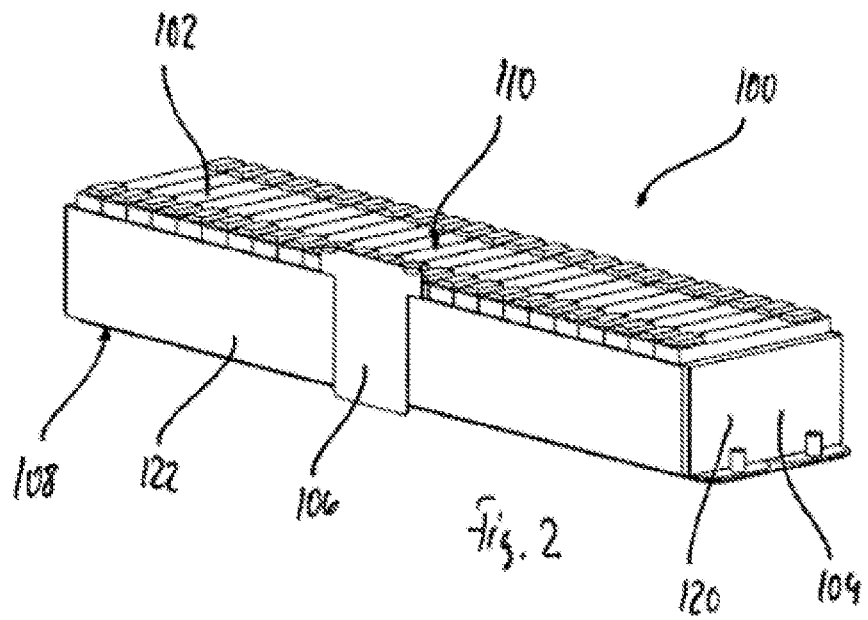
FIG. 2 shows a battery cell module having battery cells, a support structure, and a compression element, in a longitudinal sectional illustration.
Figure 3:
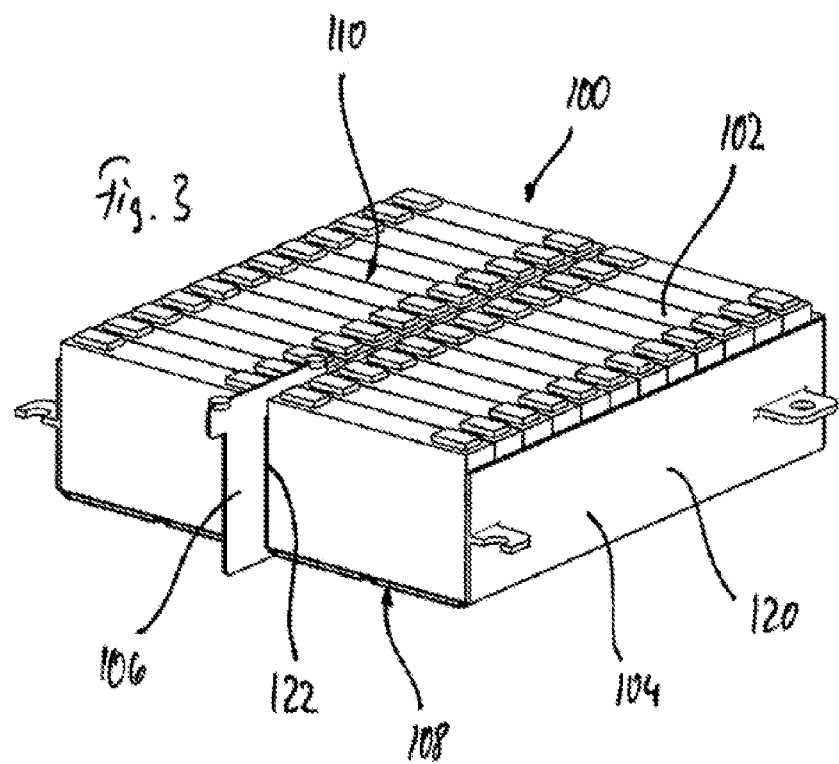
FIG. 3 shows a battery cell module having battery cells, a support structure, and a compression element, in a cross-sectional illustration.

FIG. 1 shows a battery cell module 100 having battery cells, such as 102, a support structure 104, and a compression element 106. FIG. 2 shows the battery cell module 100 in a longitudinal sectional illustration. FIG. 3 shows the battery cell module 100 in a cross-sectional illustration.

The battery cell module 100 serves as a traction battery module for the mobile application in an electrically driveable motor vehicle, and has a lower side 108, an upper side 110, and lateral sides 112, 114, 116, 118.

The support structure 104 is embodied in the form of a frame, having an external portion 120 which is disposed on the external side of the battery cells 102 and forms an external wall of the battery cell module 100, and an internal portion 122 which is disposed between groups of battery cells 102 and forms an internal wall of the battery cell module 100.

The compression element 106 is disposed so as to bear in a planar manner on the internal portion 122 of the support structure 104, and under a load from below is able to be repositioned relative to the support structure 104 so as to, at a limited input of load into the support structure 104, transmit a load from the lower side 108 to the upper side 110.

Figure 4:
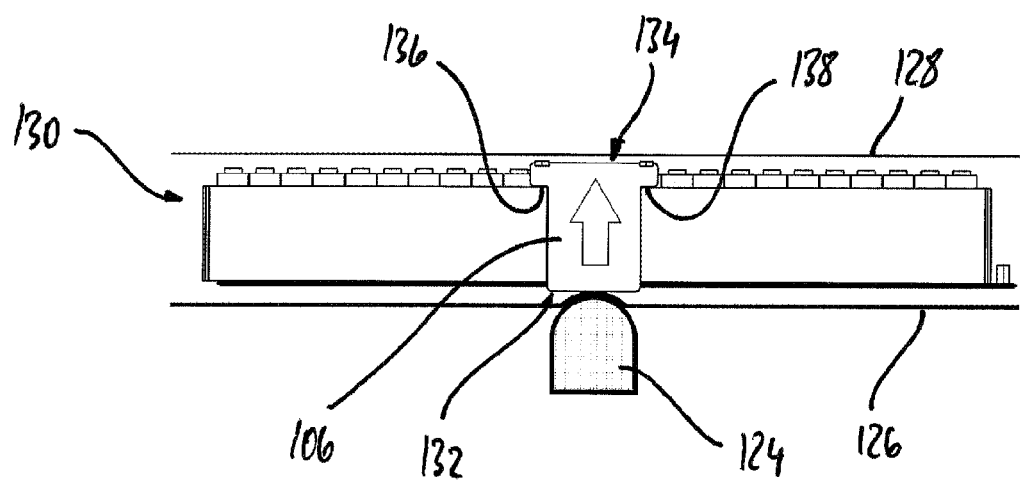
FIG. 4 shows a battery cell module having battery cells, a support structure, and a compression element in a motor vehicle, and a displacement of the compression element during an intrusion of a specimen.

FIG. 4 shows the battery cell module 100 in a motor vehicle, and a displacement of the compression element 106 during an intrusion of a bollard-shaped specimen 124.

The motor vehicle has a floor pan plate as a lower-side structure 126 and an upper-side structure 128. The lower-side structure 126 and the upper-side structure 128 delimit a receptacle space 130 in which the battery cell module 100 is disposed.

The compression element 106 is embodied as a T-shaped plate and has a lower-side load bearing portion 132 formed with the aid of a lower edge, an upper-side support portion 134 formed with the aid of an upper edge, and retaining portions 136, 138 which correspond in a form-fitting manner with the support structure 104.

The compression element 106 in a non-loaded initial position by way of the retaining portions 136, 138 thereof is held on the support structure 104 in relation to repositioning in the direction of the lower side 108 and extends downward beyond the lower side 108, wherein the load bearing portion 132 is spaced apart from the lower-side structure 126 and the support portion 134 is spaced apart from the upper-side structure 128.

When a load test is carried out, the vehicle is dynamically lowered onto the specimen 124, the specimen 124 initially deforming the lower-side structure 126 and intruding into the receptacle space 130 until contact with the support portion 134 of the compression element 106 is established.

In the subsequent operating position, the lower-side structure 126 in the region impinged by the specimen 124 bears on the load bearing portion 132 of the compression element 106. The compression element 106 as a result of the increasingly intruding specimen 124 is repositioned upward relative to the support structure 104 until the support portion 134 bears on the upper-side structure 128.

The compression element 106 in the loaded terminal position bears on the lower-side structure 126 and on the upper-side structure 128 such that a load as a result of the specimen 124 is supported on the upper-side structure 128 by way of the compression element 106, and the support structure 104 and the battery cells 102 are protected against a harmful load.

Optional features of the invention are in particular referred to using "can". Consequently, there are also refinements and/or exemplary embodiments of the invention which additionally or alternatively have the respective feature or the respective features.

If required, isolated features may also be taken from the presently disclosed combinations of features, while dispensing with a potential structural and/or functional context between the features, and be used in combination with other features in order for the subject matter of the claim to be delimited.

LIST OF REFERENCE SIGNS

100 Battery cell module
102 Battery cell
104 Support structure
106 Compression element
108 Lower side
110 Upper side
112 Lateral side
114 Lateral side
116 Lateral side
118 Lateral side
120 External portion
122 Internal portion
124 Specimen
126 Lower-side structure
128 Upper-side structure
130 Receptacle space
132 Load bearing portion
134 Support portion
136 Retaining portion
138 Retaining portion

What is claimed is:

1. A battery cell module for an electrically drivable motor vehicle, comprising:
   a lower side and an upper side;
   a support structure for battery cells; and
   battery cells supported by the support structure, wherein the battery cell module has at least one compression element positioned between battery cells within the support structure, which at a limited input of load into the support structure, is able to bear a load on the lower side and to be repositioned relative to the support structure so as to transmit a load from the lower side to the upper side.

2. The battery cell module according to claim 1, wherein the at least one compression element is held in a force-fitting and/or form-fitting manner on the support structure so as to prevent repositioning in the direction of the lower side.

3. The battery cell module according to claim 1, wherein the at least one compression element is held and/or guided in a force-fitting and/or form-fitting manner on the support structure so as to permit repositioning in the direction of the upper side without buckling.

4. The battery cell module according to claim 1, wherein the at least one compression element in a loaded operating position, at the limited input of load into the support structure, is able to be repositioned beyond the upper side.

5. The battery cell module according to claim 1, wherein the at least one compression element in a loaded terminal position, at the limited input of load into the support structure, is able to be supported above the upper side.

6. The battery cell module according to claim 1, wherein the support structure has at least one external portion and at least one internal portion, and
the at least one compression element is disposed on the at least one internal portion.

7. The battery cell module according to claim 1, wherein the at least one compression element is embodied in the form of a plate.

8. The battery cell module according to claim 1, wherein the at least one compression element has at least one lower-side load bearing portion and at least one upper-side support portion.

9. The battery cell module according to claim 1, wherein the at least one compression element has at least one retaining portion, which for preventing repositioning in the direction of the lower side corresponds in a form-fitting manner with the support structure.

10. The battery cell module according to claim 1, wherein the at least one compression element is at least partially positioned between the lower side and the upper side, and between lateral sides of the battery cell module.

11. The battery cell module according to claim 1, wherein the at least one compression element in a loaded terminal position, at the limited input of load into the support structure, can be plastically deformable while absorbing energy.

12. An electrically drivable motor vehicle, comprising:
- a lower-side structure and an upper-side structure, wherein the lower-side structure and the upper-side structure delimit a receptacle space for battery cell modules; and
- at least one battery cell module, the battery cell module comprising:
- a lower side and an upper side;
- a support structure for battery cells; and
- battery cells supported by the support structure, wherein
- the battery cell module has at least one compression element positioned between battery cells within the support structure,
- wherein the at least one compression element is able to be supported on the lower-side structure and on the upper-side structure so as to, at a limited input of load into the support structure, transmit a load from the lower side to the upper side.

13. The electrically drivable motor vehicle according to claim 12, wherein
the at least one compression element is at least partially positioned between the lower side and the upper side, and between lateral sides of the battery cell module.

14. The electrically drivable motor vehicle according to claim 12, wherein
the at least one compression element in a loaded terminal position, at the limited input of load into the support structure, can be plastically deformable while absorbing energy.

* * * * *